United States Patent
Frei

(10) Patent No.: US 7,268,178 B2
(45) Date of Patent: Sep. 11, 2007

(54) PRESSURE SENSITIVE ADHESIVE COMPOSITION

(75) Inventor: Pia Frei, Rickenbach (CH)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 11/319,330

(22) Filed: Dec. 28, 2005

(65) Prior Publication Data

US 2006/0155023 A1    Jul. 13, 2006

Related U.S. Application Data

(63) Continuation of application No. PCT/EP2004/004931, filed on May 8, 2004.

(30) Foreign Application Priority Data

Jul. 3, 2003    (EP)    ................... 03015091

(51) Int. Cl.
    *C09J 153/02*    (2006.01)
(52) U.S. Cl. ............... 524/505; 524/274; 524/499
(58) Field of Classification Search ............... 524/505, 524/274, 499
    See application file for complete search history.

(56) References Cited

U.S. PATENT DOCUMENTS 4,411,954 A    10/1983    Butch, III et al.
2004/0214952 A1*    10/2004    Kannan et al. ............. 525/133

FOREIGN PATENT DOCUMENTS

EP    1 310 524 A1    5/2003
JP    2002 097432    4/2002
WO    WO95/10576 A1    4/1995

OTHER PUBLICATIONS

"Tuftec and asaprene adhesive properties", Internet Document, 'Online! XP002255502 (Sep. 2003).
"Tuftec p series, adhesives and sealants, tuftec", Internet Document, 'Online! XP002255501 (Sep. 2003).
"Tuftec p 1000", Internet Document, 'Online! XP002255503 (Sep. 2003).
Database WPI, Section CH, Week 200252, Derwent Publications Ltd., London, GB; AN 2002-483101, XP002255504 for JP 2002 097432.
Roempp Chemie Lexikon, vol. 3, Georg Thieme Verlag, pp. 2252-2255 1990.
DIN 51378, "Determination of carbon-type composition of mineral oil", Beuth Verlag GmbH, Berlin, pp. 1-4 (Mar. 1994).
ASTM D2140:"Standard Test Method for Carbon-Type Composition of Insulating Oils of Petroleum Origin", Annual Book of ASTM Starnards, vol. 05.02, pp. 1-4 (May 2003).
DIN EN 1427 (replaced DIN 52011) "Determination of softening point-Ring and ball method", DIN Deutsches Institut fuer Normung e. V., Berlin, pp. 1-11 (Dec. 1999).

* cited by examiner

*Primary Examiner*—Peter Szekely
(74) *Attorney, Agent, or Firm*—Stephen D. Harper

(57) ABSTRACT

A hot-melt pressure-sensitive adhesive composition which, as a result of the use of a hydrogenated styrene-butadiene-butylene-styrene block copolymer, has improved properties in respect of immediate adhesion and also the removal of the hot-melt pressure-sensitive adhesive composition from a carrier substrate without leaving a residue, is described.

21 Claims, No Drawings

PRESSURE SENSITIVE ADHESIVE COMPOSITION

CROSS-REFERENCE TO RELATED APPLICATIONS

This application is a continuation under 35 USC Sections 365(c) and 120 of International Application No. PCT/EP2004/004931, filed 8 May 2004 and published 13 Jan. 2005 as WO 2005/003248, which claims priority from European Application No. 03015091.6, filed 3 Jul. 2003, each of which is incorporated herein by reference in its entirety.

FIELD OF THE INVENTION

The invention relates to a hot-melt pressure-sensitive adhesive composition for redetachable joining of two substrates.

DISCUSSION OF THE RELATED ART

Pressure-sensitive adhesives are used in the textile and nonwovens industry for temporarily fixing one substrate to another. This type of adhesive makes it possible for the substrates to be separated from one another later. A typical use example is sanitary napkins in the feminine care sector.

In the formulation of a pressure-sensitive adhesive composition, two contradictory aspects have to be taken into account. Known pressure-sensitive adhesives have a time-dependent adhesive force, i.e., adhesion increases with time. If the composition is formulated so that the initial adhesion, i.e., the immediate adhesion, allows movement-free positioning of the substrate, then the adhesive force developed after some time is such that undesirable deposits of adhesive are obtained on one substrate when the other substrate is detached again. This effect is due to cohesive rupture in the adhesive join However, if the adhesive composition is formulated so that the adhesion during use is satisfactory, problems with movement occur as a result of the associated low immediate adhesion, i.e., the initial adhesion.

U.S. Pat. No. 5,459,193 describes a hot-melt composition for typical pressure-sensitive adhesive formulations in the textile and nonwovens field, especially for applications in the feminine care sector. This composition is based on a styrene block copolymer (SBC). However, such a composition has the unsatisfactory initial adhesion mentioned at the outset. Even when part or all of the SEBS polymer is replaced by an SIS and/or SBS polymer, the initial adhesion does increase but the cohesion is at the same time reduced to such an extent that cohesive rupture occurs, i.e., residues are obtained, in the final adhesion.

BRIEF SUMMARY OF THE INVENTION

It is therefore an object of the invention to avoid the disadvantages of the known hot-melt adhesive compositions and, in particular, provide a hot-melt pressure-sensitive adhesive composition that has a high immediate adhesion and nevertheless can be removed together with the substrate which has been stuck on from the carrier substrate without leaving a residue.

The hot-melt pressure-sensitive adhesive composition of the invention comprises at least one tackifier component, at least one styrene block copolymer, a plasticizer component and, if appropriate, additives and is characterized in that the composition comprises a hydrogenated styrene-butadiene-butylene-styrene block copolymer in addition to the at least one styrene block copolymer. In contrast to solvent-based adhesive compositions, a hot-melt pressure-sensitive adhesive composition according to the invention is preferably solvent-free (cf. Römpp Chemie Lexikon, vol. 3, Georg Thieme Verlag 1990, "Klebstoffe").

DETAILED DESCRIPTION OF CERTAIN EMBODIMENTS OF THE INVENTION

As tackifier components, it is possible to use various compounds that can be employed for melt adhesives, in particular for hot-melt adhesives. Examples of such tackifier components are rosin derivatives including wood oil resins, tall oil and derivatives thereof, rosin ester resins, natural and synthetic terpene resins and also aliphatic, aromatic or mixed aliphatic-aromatic hydrocarbon resins. Further tackifier components having aromatic constituents can be prepared from monomers which each have an aromatic group and a polymerizable, unsaturated group. Suitable monomers are, for example, styrene, α-methylstyrene, vinyltoluene, methoxystyrene, tert-butylstyrene, chlorostyrene, indene monomers including methylindene and others. Aliphatic monomers are usually natural and synthetic terpenes which contain $C_5$ or $C_6$ cyclopentyl or cyclohexyl groups and have a series of aromatic, cyclic substituents. Further monomers for these tackifiers are 1,3-butadiene, cis-1,3-pentadiene, trans-1,3-pentadiene, 2-methyl-1,3-butadiene, 2-methyl-2-butene, cyclopentadiene, dicyclopentadiene, terpene, terpene-phenol resins and others. Further tackifier components which can be used are coumarin-indene resin, phenolic resins, p-tert-butylphenol-acetylene resins, phenol-formaldehyde resins, xylene-formaldehyde resins, oligomers of monoolefins or diolefins, aromatic or cycloaliphatic hydrocarbon resins, hydrogenated hydrocarbon resins, hydrocarbon resins, hydrogenated wood oil resins, hydrogenated oil resins and their esters with monofunctional or polyfunctional alcohols. Preference is given to hydrocarbon resins, polyterpene resins, rosin resin esters.

The tackifier component is added to the hot-melt pressure-sensitive adhesive composition in a proportion of from 20 to 70% by weight, preferably from 40 to 60% by weight, based on the total weight. The varying properties of the rosin component or mixture of tackifiers used in the particular case affect, within limits, the precise proportion of the tackifiers in the composition.

The styrene block copolymer is based on an A-B-A structure, i.e., styrene sections are provided at the beginning and end and, for example, a B block composed of 1,3-butadiene monomer units is located in between (SBS copolymer). A B block composed of isoprene monomers is likewise, conceivable. A more or less targeted influence on the properties of these copolymers can be exerted by variation of the block sizes in the polymerization of these block copolymers. Such different styrene block copolymers are known to those skilled in the art and can be selected from among these specifically for the intended field of use.

The use of plasticizer components allows an improvement in the physical properties of a composition, including improved processability, coatability, etc., to be achieved. In the composition of the Invention, oil-like plasticizer components are used. The plasticizer component is preferably a liquid at room temperature, for example a hydrocarbon oil or polybutene. Particular preference is given to mineral oils, especially mineral oils having a low proportion of aromatic compounds (characterized by a carbon distribution of C/A <2%, C/N <40%, C/P >60% in accordance with DIN 51378 or ASTM D 2140). Further suitable compounds are olefin oligomers, low molecular weight polybutene polymers, vegetable oils and derivatives thereof and other, suitable plasticizer liquids. The proportion of this plasticizer component in the pressure-sensitive adhesive composition is from 20 to 40% by weight, preferably from 25 to 35% by weight, based on the total mass.

An advantageous influence on, inter alia, the stability of the pressure-sensitive adhesive can be exerted by addition of additives to the composition of the invention Suitable additives as stabilizer are, for example, sterically hindered phenols, phosphites or thioesters. These can to a certain extent suppress decomposition reactions which occur as a result of atmospheric oxygen or other external influences (e.g. irradiation with light).

The hydrogenated styrene-butadiene-butylene-styrene block copolymer has, in addition to the two terminal styrene blocks, a central block which is once again composed of butadiene and butylene monomer blocks. This butadiene-butylene block is preferably selectively hydrogenated. This modification allows some matching of the copolymers to requirements. The ratio of styrene block sections to the total amounts of olefin block and alkylene block can vary and is in the range from about 20:80 to about 80:20. Ratios in the range from 25:75 to 35:65 and in the range from 60:40 to 75:25 are advantageous. Particular preference is given to a ratio of about 30:70.

The invention is illustrated by the following examples. The amounts indicated are, unless explicitly stated otherwise, percentages by weight based on the total composition.

EXAMPLE 1

52.3% by weight of hydrocarbon resins (ESCOREZ 5400 40.3% by weight; ESCOREZ 5415 12% by weight, Exxon Mobil) and 30% by weight of an oil (Shell CATENEX PH941, Shell) are mixed with 10% by weight of an SBS polymer (EUROPRENE SOL TE 6414, Polimeri Europa). Stabilizers (IRGANOX 1010 and IRGANOX PS 800, each 0.1% by weight; Ciba) are additionally added to this mixture. In addition, 7.5% by weight of an SBBS polymer (TUFTEC P1000; Asahi Kasei) are added to the mixture.

The solvent-free composition has a slightly yellowish, transparent appearance and has a softening point of 93° C. in accordance with DIN 52011.

The use of the SBBS polymer surprisingly results in the initial and final adhesion values and also the cohesion fully satisfying use requirements.

EXAMPLES 2-4

Examples 2 to 4 were prepared by the procedure of Example 1; their respective compositions are shown in Table 1.

TABLE 1

Compositions of Examples 2–4

|  | 2 | 3 | 4 |
|---|---|---|---|
| TUFTEC P1000 | 5% | 7.5% | 5% |
| EUROPRENE SOL TE 6414 | 10% | 10% | 10% |
| ESCOREZ 5400 | 42.8 | 40.3 | 40.3 |
| ESCOREZ 5415 | 12 | 9 | 6 |
| SYLVARES SA 115 | — | 3 | 6 |
| Shell CATENEX PH941 | 30 | 30 | 30 |
| IRGANOX 1010 | 0.1 | 0.1 | 0.1 |
| IRGANOX PS800 | 0.1 | 0.1 | 0.1 |

The comparative Examples C1 and C2 were prepared analogously, and their compositions are shown in Table 2.

TABLE 2

Compositions of comparative Examples C1 and C2

|  | C1 | C2 |
|---|---|---|
| KRATON D 1107 | 15 | — |
| KRATON G 1650 | — | 15 |
| EUROPRENE SOL T 168 | 15 | — |
| ESCOREZ 5300 | 49 | 34 |
| ESCOREZ 5320 | — | 20 |
| Shell CATENEX PH 941 | 20 | 30 |
| IRGANOX 1010 | 1 | 1 |

The hot-melt pressure-sensitive adhesive compositions of Examples 1 to 4 and of the comparative examples were melted as a thin layer onto a PE film (weight applied: 25 g/m$^2$). Pieces of this film were stuck onto a cotton substrate and pulled off at an angle of 90° by means of a tensile testing machine at a speed of 500 mm/min both immediately and after a storage time of 4 hours at 40° C. under a load of 36 g/m$^2$. The adhesion in N/25 mm was measured, and a visual assessment of adhesive residues on the cotton substrate was made.

Table 3 shows the results obtained.

TABLE 3

Measured values for the peel tests on cotton (cot.)

|  | 1 | 2 | 3 | 4 | C1 | C2 |
|---|---|---|---|---|---|---|
| Peel (immediate) | 2.7 | 2.9 | 2.3 | 2.5 | 0.9 | 0.9 |
| Residue on cot. | none | none | none | none | none | none |
| Peel (delayed) | 2.4 | 3.2 | 3.0 | 2.8 | 1.7 | 2.4 |
| Residue on cot. | none | none | none | none | none | none |

The measured values are reported in N/25 mm.

The results of the peel tests on compositions of Examples 1 to 4 clearly show the improved adhesion values both immediately after application and on removal after a period of delay. The comparative examples C1 and C2 clearly show relatively large differences between these pairs of values.

What is claimed is:

1. A hot-melt pressure-sensitive adhesive composition comprising at least one tackifier component, at least one styrene block copolymer, a plasticizer component and at least one hydrogenated styrene-butadiene-butylene-styrene block copolymer in addition to the at least one styrene block copolymer, wherein the hydrogenated styrene-butadiene-butylene-styrene block copolymer has a ratio of styrene block sections to the total amounts of olefin block and alkylene block in the range from 20:80 to 80:20.

2. The pressure-sensitive adhesive composition as claimed in claim 1, wherein the tackifier component is selected from the group consisting of hydrocarbon resins, polyterpene resins, rosin resin esters, and mixtures thereof.

3. The pressure-sensitive adhesive composition as claimed in claim 1, wherein the plasticizer component is selected from the group consisting of hydrocarbon oils, polybutene, mineral oils, olefin oligomers, vegetable oils and vegetable oil derivatives and mixtures thereof.

4. The pressure-sensitive adhesive composition as claimed in claim 1, wherein the hydrogenated styrene-butadiene-butylene-styrene block copolymer has a ratio of styrene block sections to the total amounts of olefin block and alkylene block of about 30:70.

5. The pressure-sensitive adhesive composition as claimed in claim 1, wherein the hydrogenated styrene-butadiene-butylene-styrene block copolymer has a ratio of styrene block sections to the total amounts of olefin block and alkylene block in the range from 25:75 to 35:65.

6. The pressure-sensitive adhesive composition as claimed in claim 1, wherein the hydrogenated block copolymer comprises from 3 to 20% by weight of the pressure-sensitive adhesive composition.

7. The pressure-sensitive adhesive composition as claimed in claim 1, wherein the hydrogenated block copolymer comprises from 4 to 15% by weight of the pressure-sensitive adhesive composition.

8. The pressure-sensitive adhesive composition as claimed in claim 1, wherein the hydrogenated block copolymer comprises from 5 to 10% by weight of the pressure-sensitive adhesive composition.

9. The pressure-sensitive adhesive composition as claimed in claim 1, wherein said at least one styrene block copolymer has an A-B-A structure wherein A represents a polystyrene block and B represents a poly-1,3-butadiene or polyisoprene block.

10. A hot-melt pressure-sensitive adhesive composition comprising at least one tackifier component, at least one styrene block copolymer, a plasticizer component and at least one hydrogenated styrene-butadiene-butylene-styrene block copolymer in addition to the at least one styrene block copolymer, wherein the at least one tackifier component is present in the pressure-sensitive adhesive composition in a proportion of from 20 to 70% by weight.

11. The pressure-sensitive adhesive composition as claimed in claim 10, wherein the at least one tackifier component is present in the pressure-sensitive adhesive composition In a proportion of from 40 to 60% by weight.

12. The pressure-sensitive adhesive composition as claimed in claim 1, wherein the pressure-sensitive adhesive composition additionally comprises at least one stabilizer.

13. The pressure-sensitive adhesive composition as claimed in claim 1, additionally comprising at least one additive in a proportion of from 0.05 to 3% by weight.

14. A hot-melt pressure-sensitive adhesive composition comprising at least one tackifier component, at least one styrene block copolymer, a plasticizer component and at least one hydrogenated styrene-butadiene-butylene-styrene block copolymer in addition to the at least one styrene block copolymer, wherein the proportion of plasticizer component is from 20 to 40% by weight.

15. The pressure-sensitive adhesive composition as claimed in claim 14, wherein the proportion of plasticizer component is from 25 to 35% by weight.

16. The pressure-sensitive adhesive composition of claim 1, wherein said plasticizer component is a mineral oil having a carbon distribution of C/A <2%, C/N <40% and C/P >60% as measured in accordance with ASTM D 2140.

17. A pressure-sensitive adhesive composition, comprising at least one styrene block copolymer, from 3 to 20% by weight of at least one hydrogenated styrene-butadiene-butylene-styrene block copolymer in addition to the at least one styrene block copolymer, from 20 to 70% by weight of at least one tackifier component, and from 20 to 40% by weight of a plasticizer component, wherein the hydrogenated styrene-butadiene-butylene-styrene block copolymer has a ratio of styrene block sections to the total amounts of olefin block and alkylene block in the range from 20:80 to 80:20.

18. A pressure-sensitive adhesive composition, comprising at least one styrene block copolymer, from 4 to 15% by weight of at least one hydrogenated styrene-butadiene-butylene-styrene block copolymer in addition to the at least one styrene block copolymer, from 40 to 60% by weight of at least one tackifier component, and from 25 to 35% by weight of a plasticizer component, wherein the hydrogenated styrene-butadiene-butylene-styrene block copolymer has a ratio of styrene block sections to the total amounts of olefin block and alkylene block In the range from 25:75 to 35:65 and said at least one styrene block copolymer has an A-B-A structure wherein A represents a polystyrene block and B represents a poly-1,3-butadiene or polyisoprene block.

19. A method of modifying the immediate adhesion and long-term adhesion of a hot-melt pressure-sensitive adhesive composition, said method comprising incorporating at least one hydrogenated styrene-butadiene-butylene-styrene block copolymer into said adhesive composition, wherein the hydrogenated styrene-butadiene-butylene-styrene block copolymer has a ratio of styrene block sections to the total amounts of olefin block and alkylene block in the range from 20:80 to 80:20.

20. The method as claimed in claim 19, wherein the hot-melt pressure-sensitive adhesive composition comprises at least one hydrocarbon tackifier, at least one styrene block copolymer other than the hydrogenated styrene-butadiene-butylene-styrene block copolymer, and a plasticizer component.

21. A substrate comprising an at least partial coating of a hot-melt pressure-sensitive adhesive composition as claimed in claim 1.

* * * * *

UNITED STATES PATENT AND TRADEMARK OFFICE
CERTIFICATE OF CORRECTION

| | |
|---|---|
| PATENT NO. | : 7,268,178 B2 |
| APPLICATION NO. | : 11/319330 |
| DATED | : September 11, 2007 |
| INVENTOR(S) | : Frei |

Page 1 of 1

It is certified that error appears in the above-identified patent and that said Letters Patent is hereby corrected as shown below:

Column 5, line 44 Claim 11, delete "In" and insert therefor --in--.

Column 6, line 31 Claim 18, delete "In" and insert therefor --in--.

Signed and Sealed this

Twenty-fifth Day of March, 2008

JON W. DUDAS
*Director of the United States Patent and Trademark Office*